United States Patent [19]
Slatkin et al.

[11] 3,896,615
[45] July 29, 1975

[54] GAS TURBINE ENGINE FOR SUBSONIC FLIGHT

[75] Inventors: Martin S. Slatkin, Manchester;
David L. Motycka, Glastonbury;
Vincent J. Disabato, Southington, all of Conn.

[73] Assignee: United Aircraft Corporation, East Hartford, Conn.

[22] Filed: Oct. 4, 1974

[21] Appl. No.: 512,286

Related U.S. Application Data
[63] Continuation of Ser. No. 330,792, Feb. 8, 1973, abandoned.

[52] U.S. Cl................. 60/204; 60/226 R; 60/271; 239/265.11
[51] Int. Cl.²...................... F02K 3/06; F02K 1/24
[58] Field of Search......... 60/226 R, 262, 271, 204; 239/265.11

[56] References Cited
UNITED STATES PATENTS
| | | | |
|---|---|---|---|
| 3,044,258 | 7/1962 | Carlton et al. | 60/244 |
| 3,520,138 | 7/1970 | Fox | 60/226 R |

*Primary Examiner*—William L. Freeh
*Assistant Examiner*—Robert E. Garrett
*Attorney, Agent, or Firm*—Robert C. Walker

[57] ABSTRACT

A gas turbine engine for use on an aircraft which flies entirely within a subsonic velocity range is provided with a fixed area convergent-divergent nozzle to provide better overall engine performance.

3 Claims, 3 Drawing Figures

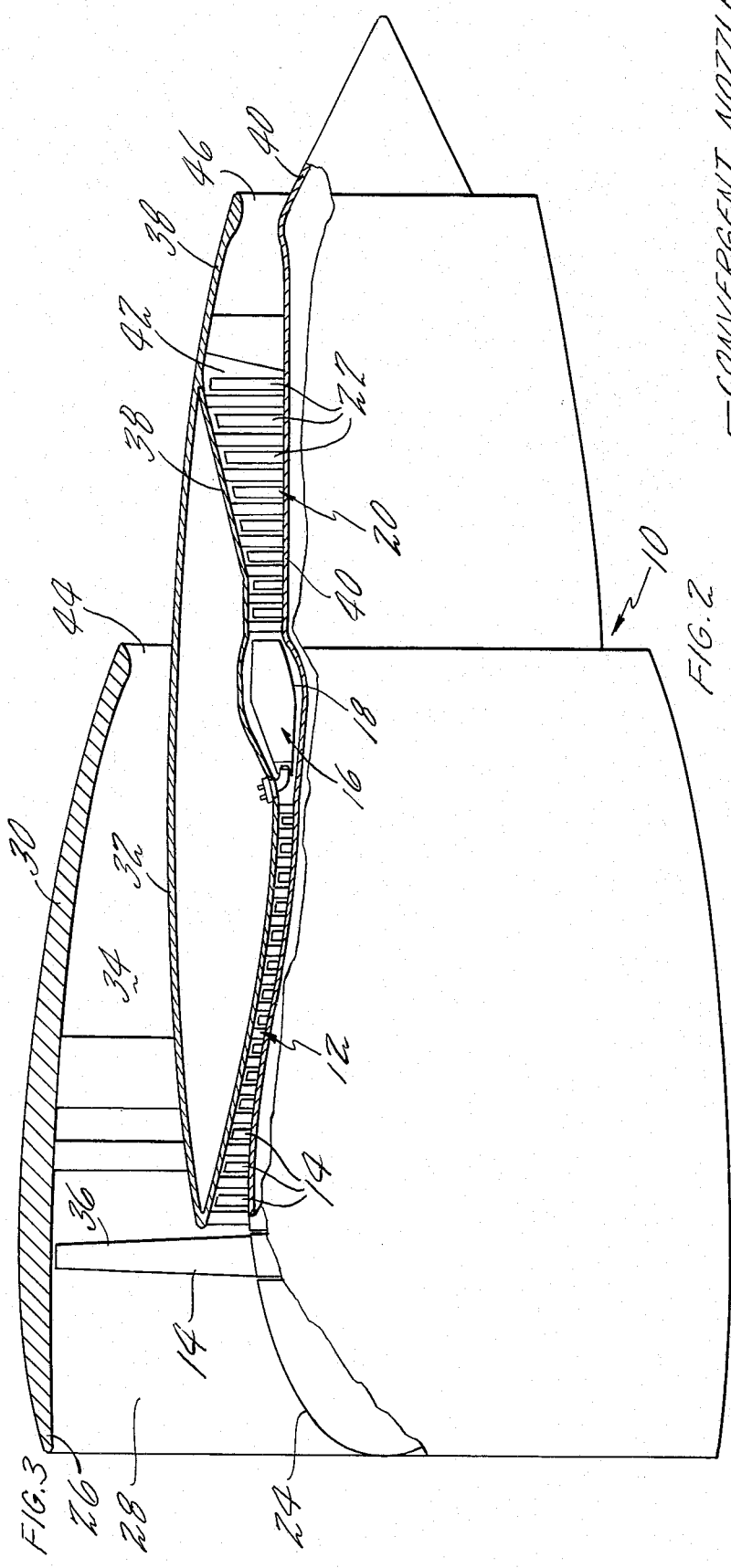

GAS TURBINE ENGINE FOR SUBSONIC FLIGHT

CROSS REFERENCE TO RELATED APPLICATIONS

This application is a continuation of application Ser. No. 330,792, now abandoned, which was filed on Feb. 8, 1973, and assigned to United Aircraft Corporation.

BACKGROUND OF THE INVENTION

1. Field of the Invention

This invention relates to exhaust nozzles for gas turbine engines, and more particularly to exhaust nozzles for gas turbine engines used on subsonic aircraft.

2. Description of the Prior Art

Three important parameters in the design of a gas turbine engine are cycle efficiency, stability (surge margin), and thrust output. Each of these parameters is dependent upon many variables including such things as the speed and range of the aircraft on which the engines are to be mounted, the type of engine being designed (i.e. turbojet, turbofan, etc.). The shape and type of exhaust nozzles used on these engines will have an effect on these parameters. Compromises must always be made since although a nozzle of one particular size and shape may produce the best thrust picture over the entire range of engine operating modes such as takeoff, climb and cruise, it may reduce cycle efficiency or engine stability. Exhaust nozzles for gas turbine engines used on subsonic aircraft have always been of the convergent type, since it has been thought that a convergent type nozzle is the only type that can provide a suitable compromise.

One significant drawback of a convergent nozzle used on a subsonic aircraft is the fact that it provides less than ideal flow at takeoff operation. It is often desirable when optimizing thrust, cycle efficiency and stability of an engine to have higher than ideal flow at takeoff relative to an ideal flow match at cruise. This is not possible to achieve with a fixed area convergent nozzle. A possible solution to this requirement is to use a variable area convergent nozzle; however, the weight and cost penalties associated with a variable area nozzle for a subsonic aircraft outweigh the performance penalties associated with a fixed convergent nozzle, and therefore such nozzles have not been employed.

SUMMARY OF THE INVENTION

It is an object of the present invention to improve the operation of a gas turbine engine used on a jet aircraft which operates entirely within a subsonic velocity range.

According to the present invention a gas turbine engine for use on a jet aircraft operating entirely within a subsonic velocity range is provided with a fixed area convergent-divergent exhaust nozzle. More particularly, the ratio of the nozzle exit area to the minimum cross-sectional area of the nozzle (hereinafter referred to as $A_E/A_M$ or the "area ratio") is greater than 1.0 but less than or equal to 1.1.

As a subsonic jet aircraft goes from takeoff through climb to cruising speed the ratio of nozzle total pressure $P_T$ to ambient static pressure $P_A$ (hereinafter referred to as $P_T/P_A$ or the "pressure ratio") varies over the range of from 1.0 to approximately 3.0 with takeoff being within the range of 1.0 to 2.0. Those skilled in the art never seriously considered using a fixed area convergent-divergent nozzle for a subsonic engine application probably because of their experience and familiarity with the operating characteristics of convergent-divergent nozzles designed for use on supersonic and hypersonic engines. The range of pressure ratios over which these supersonic nozzles are particularly adapted to perform is outside the range of pressure ratios of interest and concern for engines used on subsonic aircraft, some being designed to operate at pressure ratios of 40 or more. Aerodynamic and analytic analysis of these convergent-divergent supersonic nozzles at low subsonic pressure ratios (i.e. between 1.0 and 3.0) led to the conclusion that they would produce thrust penalties within these ranges even greater than the thrust penalties exhibited by convergent nozzles and would therefore not be suitable for use on subsonic aircraft. These conclusions were correct with respect to the supersonically designed convergent-divergent nozzles; however, they were erroneous with respect to convergent-divergent nozzles designed according to the present invention.

The present invention arose from the surprising discovery that for fixed area convergent-divergent nozzles having area ratios completely outside the range of area ratios used on nozzles designed for supersonic flight the flow through the throat of the nozzle could be made to exceed the flow through a convergent nozzle of the same throat area at low pressure ratios. In another words, the effective cross-sectional flow area of a fixed area convergent-divergent nozzle could be made to increase as the pressure ratio decreases. Thus, the fixed area convergent-divergent nozzle is able to provide performance similar to that which may be achieved with a variable area convergent-divergent nozzle without the additional cost and weight penalties.

Although it is true that the thrust per pound of mass flow associated with the use of a fixed area convergent-divergent nozzle is sometimes less than the thrust per pound of mass flow through a conventional convergent nozzle at low pressure ratios, it was discovered that when the area ratio of a fixed area convergent-divergent nozzle is greater than 1.0 but less than or equal to 1.1, the net thrust of a convergent-divergent nozzle is often larger than the net thrust of a convergent nozzle in view of the increased mass flow through a convergent-divergent nozzle due to the increase in the effective cross-sectional flow area at low pressure ratios.

The foregoing and other objects, features and advantages of the present invention will become more apparent in the light of the following detailed description of preferred embodiments thereof as illustrated in the accompanying drawing.

BRIEF DESCRIPTION OF THE DRAWING

FIG. 2 is a graph which is illustrative of the thrust efficiency of nozzles of various designs.

FIG. 3 is a schematic side elevation view, partly broken away and partly in section showing a turbofan engine which incorporates the present invention.

DESCRIPTION OF THE PREFERRED EMBODIMENT

Figure 1:
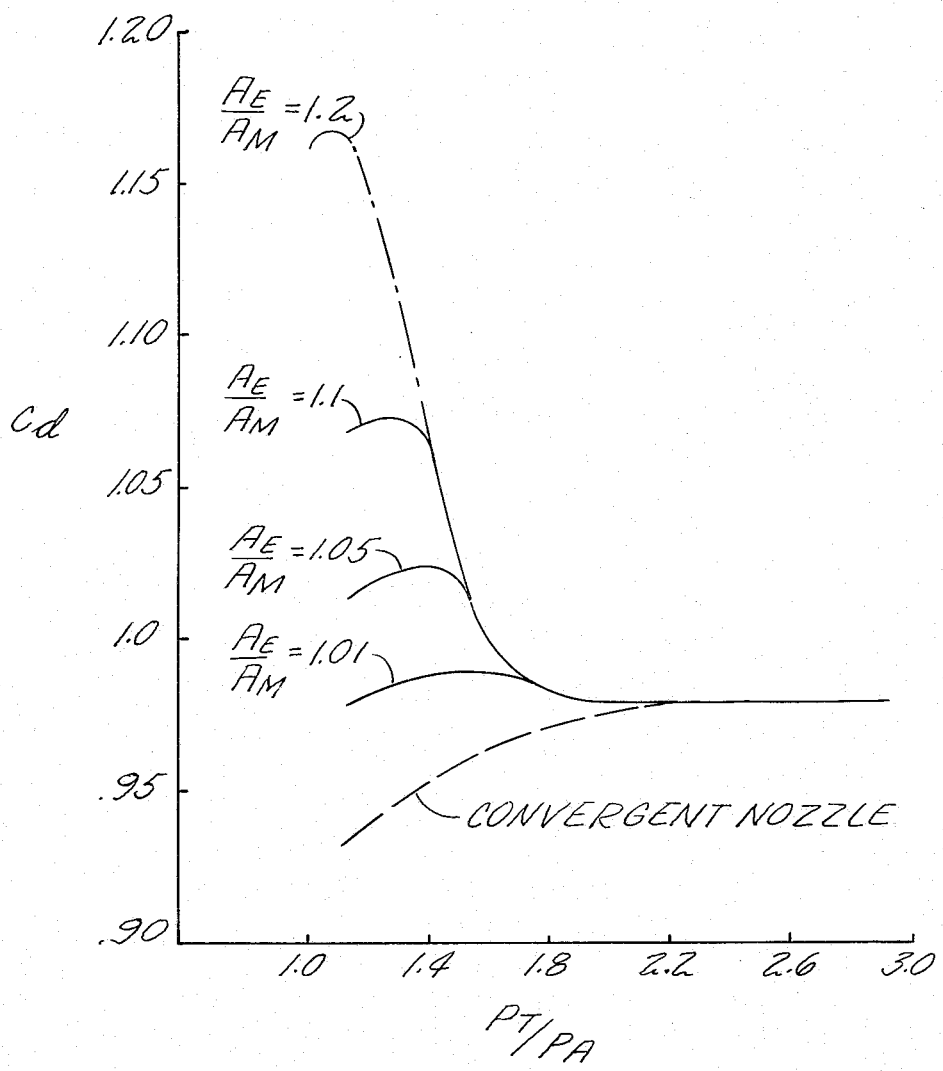
FIG. 1 is a graph which is illustrative of the flow coefficient of nozzles of various designs.

FIG. 1 is a graph which plots flow coefficient $C_d$ on the vertical scale and the pressure ratio on the horizontal scale. $C_d$ is directly proportional to the ratio of the effective cross-sectional flow area of the nozzle to the actual cross-sectional flow area of the nozzle at the nozzle throat; it is also directly proportional to the ratio of the actual mass flow through the nozzle to the ideal mass flow through the nozzle, the latter being based on the velocity of the flow through the nozzle achieved when expanding the flow isentropically to the ambient static pressure. The range of pressure ratios on the horizontal scale is shown from 1.0 to 3.0, the range within which a subsonic gas turbine engine operates. Generally, the range of pressure ratios from 1.0 through 2.0 represent takeoff mode, and the range of pressure ratios from 2.0 to 3.0 represent the cruise mode.

FIG. 2 is a companion graph to FIG. 1 and plots thrust coefficient $C_r$ on the vertical scale and pressure ratio on the horizontal scale. $C_r$ is directly proportional to the ratio of the actual thrust per pound of mass flow through the nozzle to the ideal thrust per pound of mass flow achieved when expanding the flow isentropically to the ambient static pressure. It should be pointed out at this time that the graphs of both FIG. 1 and FIG. 2 are intended to be illustrative only, such that the relative performance of various nozzles may be compared; they are accurate to the extent that they agree with actual data on hand for a particular gas turbine engine, but they are not intended to be used as a means for choosing a proper exhaust nozzle for any engine in general.

Referring now to FIG. 1, the dashed line represents a convergent nozzle for the fan exhaust stream of a turbofan engine. Note that at pressure ratios above 2.2 the flow coefficient is constant at 0.980. This is choked flow and the effective cross-sectional flow area of this nozzle is unable to go any higher. As the pressure ratio drops from 2.2 down to 1.2 the flow coefficient and thus the effective cross-sectional flow area drops off rather quickly. Referring now to FIG. 2, the dashed line represents this same nozzle. As can be seen, over a range of pressure ratios between 1.2 and 3.0 this nozzle has a relatively high thrust coefficient. From the point of view of thrust coefficient ($C_r$) this is an excellent nozzle. However, it is often the case that for optimum cycle efficiency and stability at takeoff, it is desirable to have a flow coefficient ($C_d$) greater than that available with a convergent nozzle at pressure ratios less than 2.0.

Referring again to the graph of FIG. 1, the solid lines represent a family of curves for fixed convergent-divergent fan exhaust nozzles according to the present invention having various area ratios from 1.01 to 1.1. It can be seen that these nozzles also have a limiting flow coefficient for pressure ratios greater than 2.0. Thus, at least from the point of view of flow coefficient in the cruise mode, the convergent-divergent nozzle appears to be at least as good as the convergent nozzle. However, below pressure ratios of approximately 2.0 it is possible to have a significantly greater flow coefficient than a convergent nozzle.

Referring to the graph of FIG. 2, the solid lines represent curves for convergent-divergent nozzles corresponding to the curves for the convergent-divergent nozzles shown in the graph of FIG. 1. By comparing these different area ratio curves, it can be seen that as the area ratio ($A_E/A_M$) increases the thrust coefficient generally decreases. Note that the pressure ratio at the point of lowest thrust coefficient varies from curve to curve. The actual thrust produced by a particular engine at a particular pressure ratio is directly proportional to the product of the flow coefficient and the thrust coefficient (i.e. $C_d \times C_r$) at that particular pressure ratio. Generally, it is the thrust at the takeoff pressure ratio which is of the most concern.

For the purposes of illustration it shall be assumed that the takeoff pressure ratio is 1.5. This is a typical takeoff pressure ratio; however, depending on the engine, the takeoff pressure ratio might be anywhere between approximately 1.2 and 2.0. Using the graph of FIG. 1, the convergent-divergent nozzle which has a maximum flow coefficient at a pressure ratio of 1.5 with the smallest loss in thrust efficiency is the convergent-divergent nozzle having an area ratio of 1.05. Examining the thrust coefficient curve of this same convergent-divergent nozzle, it appears to have its lowest thrust coefficient in the neighborhood of a pressure ratio of 1.6. As a matter of fact, the thrust coefficient curve of the convergent nozzle is actually better than the thrust coefficient curve of the convergent-divergent nozzle over most of the low pressure ratio range of interest. However, if the thrust coefficient and the flow coefficient of each nozzle at a pressure ratio of 1.5 are multiplied together the result is that the convergent-divergent nozzle produces significantly more thrust than the convergent nozzle at takeoff. It should be recalled that for many engines it is very desirable to increase the effective cross-sectional flow area of the nozzle at takeoff to obtain improved cycle efficiency and stability; from the foregoing it becomes apparent that a fixed area convergent-divergent nozzle may often be able to provide such an improvement without a thrust penalty and sometimes with a thrust gain within the critical takeoff mode of the engine and without a thrust loss at cruise.

Also plotted on the graphs of FIGS. 1 and 2 using a dash-dot line is a fixed area convergent-divergent nozzle having an area ratio of 1.2. Note that for such a nozzle there is a very large drop in the thrust coefficient within the cruise range of pressure ratios (i.e. 2.0 – 3.0). Generally, convergent-divergent nozzles having these higher area ratios are used for supersonic and hypersonic engine applications where the takeoff pressure ratios are 2.0 or higher and where the cruise pressure ratios are 20, 30, or 40 or higher. Note that at a pressure ratio of 2.0 (takeoff) there is no increase in flow to compensate for the reduced thrust coefficient; at the high cruise pressure ratios the thrust coefficient is back up to 0.98 and higher (not shown on the graph) and is thus acceptable. It becomes apparent that nozzles having area ratios in excess of 1.1 are unsuitable for use when cruise pressure ratios are between 2.0 and 3.0 as in subsonic aircraft engines.

Referring now to FIG. 3, a turbofan engine generally represented by the numeral 10 is shown. The engine 10 is intended for use on an aircraft operating entirely within a subsonic velocity range. The engine 10 comprises a compressor section 12 including a plurality of compressor stages 14, a combustor section 16 downstream of the compressor section 12, and including combustor means such as the annular combustion chamber 18. The engine 10 also includes a turbine section 20 downstream of the combustion section 16, the turbine section including a plurality of turbine stages 22. Inlet means 24, 26 upstream of the compressor section 12 define an annular flow path 28 for directing air into the compressor section 12. Wall means 30, 32 form an outer annular flow passage 34 downstream of the first compressor stage 36 which is a fan stage. The flow passage 34 in this particular embodiment is a bypass duct since the flow through this passage does not pass through the core engine which comprises the compressor section 12, the combustor section 16, and the turbine section 20. Wall means 38, 40 form an annular flow passage 42 downstream of the compressor section 12 for carrying the flow of air exiting from the compressor section 12. Wall means 30, 32 and wall means 38, 40 each form outlets 44, 46 respectively at the downstream end of their respective flow passages 34, 42 respectively. During engine operation the pressure ratio $P_T/P_A$ across the outlets 44, 46 is within the range of from 1.0 to 3.0. In this exemplary embodiment the outlets 44, 46 are both fixed area convergent-divergent nozzles designed according to the present invention.

The JT9D-20 is a turbofan engine manufactured by Pratt and Whitney Aircraft, a division of United Aircraft Corporation, assignee of the present invention. The JT9D-20 has a configuration similar to the configuration of the turbofan engine 10 of FIG. 3. The area ratio $A_E/A_M$ of the JT9D-20 bypass stream outlet (corresponding to the outlet 44 in FIG. 3) is 1.005, and the area ratio $A_E/A_M$ of the JT9D-20 core engine stream outlet (corresponding to the outlet 46 in FIG. 3) is 1.025. It should be noted that the shape of the outlets 44, 46 in FIG. 3 are exaggerated to show that they are convergent-divergent outlets, since it is apparent from the area ratios hereinbefore given for the JT9D-20 that the convergent-divergent nature of the outlets would be barely discernible although their beneficial effect on engine performance is significant.

It is of course apparent from the foregoing that the present invention is applicable to engines other than the turbofan type shown in FIG. 3. It may be useful on a turbofan engine wherein the bypass airstream and the core engine airstream are discharged into a common duct whereupon the gases are discharged to atmosphere. It might be useful on a conventional turbojet engine having only a core stream. It should also be recognized that this type of exhaust nozzle is not necessarily suitable for every subsonic engine, but depends on many engine variables and parameters, a few of which have hereinbefore been discussed. Thus, it is possible that a turbofan engine having a core stream and a bypass stream might only use the present invention on only one of said streams, the other being provided with a conventional convergent nozzle. It is a matter of matching the turbomachinery of the engine and compromising between thrust efficiency, cycle efficiency and stability.

It should be understood by those skilled in the art that the foregoing and other various changes and omissions in the form and detail of the invention may be made therein without departing from the spirit and scope of the invention.

Having thus described typical embodiments of our invention, that which we claim as new and desire to secure by Letters Patent of the United States is:

1. In an aircraft gas turbine engine having an exhaust nozzle and including means for maintaining a pressure ratio below the critical pressure ratio across the exhaust nozzle on takeoff, the improvement which comprises:

a fixed geometry, convergent-divergent exhaust nozzle having a ratio of nozzle exit area ($A_E$) to minimum nozzle area ($A_M$) which is greater than 1.0 but less than or equal to 1.1.

2. The invention according to claim 1 wherein the exhaust nozzle is annular.

3. The method of operating a turbofan engine on takeoff wherein the engine has a fan exhaust nozzle including the steps of:

maintaining a pressure ratio below the critical pressure ratio across the exhaust nozzle; and maintaining an area ratio between the nozzle exit area ($A_E$) and the nozzle minimum area ($A_M$) which is greater than 1.0 but less than or equal to 1.1.

* * * * *